United States Patent
Duluk, Jr. et al.

(10) Patent No.: US 8,760,455 B2
(45) Date of Patent: Jun. 24, 2014

(54) RESTART INDEX THAT SETS A TOPOLOGY

(75) Inventors: Jerome F. Duluk, Jr., Palo Alto, CA (US); Thomas Roell, Denver, CO (US); James C. Bowman, Pescadero, CA (US)

(73) Assignee: NVIDIA Corporation, Santa Clara, CA (US)

( * ) Notice: Subject to any disclaimer, the term of this patent is extended or adjusted under 35 U.S.C. 154(b) by 811 days.

(21) Appl. No.: 12/897,622

(22) Filed: Oct. 4, 2010
(Under 37 CFR 1.47)

(65) Prior Publication Data
US 2011/0109638 A1    May 12, 2011

Related U.S. Application Data

(60) Provisional application No. 61/248,810, filed on Oct. 5, 2009.

(51) Int. Cl.
*G06T 1/00* (2006.01)
*G06F 15/80* (2006.01)
*G06T 1/20* (2006.01)

(52) U.S. Cl.
USPC ............... 345/522; 345/505; 345/506

(58) Field of Classification Search
None
See application file for complete search history.

(56) References Cited

U.S. PATENT DOCUMENTS

| 7,170,512 B2 * | 1/2007 | Southwell et al. | 345/420 |
| 2008/0170079 A1 * | 7/2008 | Ramshaw | 345/501 |
| 2008/0276066 A1 * | 11/2008 | Lee et al. | 711/204 |

OTHER PUBLICATIONS

OpenGL Programming Guide: The Official Guide to Learning OpenGL Versions 3.0 and 3.1, Seventh Edition, Dave Shreiner, The Khronos OpenGL ARB Working Group, Addison-Wesley, Jul. 2009.*

* cited by examiner

*Primary Examiner* — Maurice L McDowell, Jr.
*Assistant Examiner* — Donna J Ricks
(74) *Attorney, Agent, or Firm* — Patterson & Sheridan, LLP

(57) ABSTRACT

One embodiment of the present invention sets forth a technique for reducing overhead associated with transmitting primitive draw commands from memory to a graphics processing unit (GPU). Command pairs comprising an end draw command and a begin draw command associated with a conventional graphics application programming interface (API) are selectively replaced with a new construct. The new construct is a reset topology index, which implements a combined function of the end draw command and begin draw command. The new construct improves efficiency by reducing total data transmitted from memory to the GPU.

24 Claims, 11 Drawing Sheets

RESTART INDEX THAT SETS A TOPOLOGY

CROSS-REFERENCE TO RELATED APPLICATIONS

This application claims priority benefit to United States provisional patent application titled, "RESTART INDEX THAT SETS A TOPOLOGY," filed on Oct. 5, 2009 and having Ser. No. 61/248,810.

BACKGROUND OF THE INVENTION

1. Field of the Invention

Embodiments of the invention relate generally to draw commands for graphics, and more specifically to a restart index that sets a topology.

2. Description of the Related Art

In conventional graphics processing systems, an application programming interface (API), such as OpenGL, is used to convey scene information comprising primitive draw commands from a user application to a rendering engine. The rendering engine typically includes a graphics processing unit (GPU) configured to receive the primitive draw commands via buffers residing in memory. The OpenGL API includes explicit begin and end draw commands used to delineate primitive draw commands within an overall command sequence. Primitive draw commands are placed between a begin draw command and an end draw command as part of the overall command sequence, which is conventionally generated by the user application and transmitted via the API to the GPU for rendering. While begin and end draw commands enable the user application to delineate primitive draw commands within the overall command sequence, the begin and end draw commands also introduce overhead in the overall command sequence.

In common usage scenarios, primitive draw commands for different types of primitive topologies are typically intermixed within the overall command sequence. As scene complexity increases and finer scene detail becomes more common, command sequences are incorporating a greater portion of smaller primitives of different intermixed topologies. As a result, overhead in the command sequence is becoming more significant, thereby diminishing overall performance.

Accordingly, what is needed in the art is a technique for reducing the overhead associated with transmitting primitive draw command sequences.

SUMMARY OF THE INVENTION

One embodiment of the invention sets forth a method for composing an index sequence from an application programming interface (API) command sequence. The method includes receiving a topology element via an application programming interface (API), instantiating a reset topology index within the index sequence, and instantiating the set of vertex indices within the index sequence, where the vertex indices refer to vertex data residing in a vertex buffer. The index sequence resides in an index buffer and is transmitted to a graphics processing unit (GPU) for processing.

Another embodiment of the invention sets forth a method for interpreting the index sequence for processing within the GPU. The method includes receiving data from the index sequence, determining that a current index is a reset topology index, concluding a current topology, and setting the current topology to a newly specified topology based on a topology descriptor extracted from the reset topology index.

In one embodiment, the reset topology index comprises sixteen bits, a constant pattern used to identify the reset topology index comprises a string of ones in the twelve most significant bits, and a topology descriptor comprises four least significant bits. The index sequence resides in memory.

One advantage of the techniques described herein is that index sequences are composed using reset topology indices that reduce the total amount of data transmitted to the GPU, thereby improving overall system performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
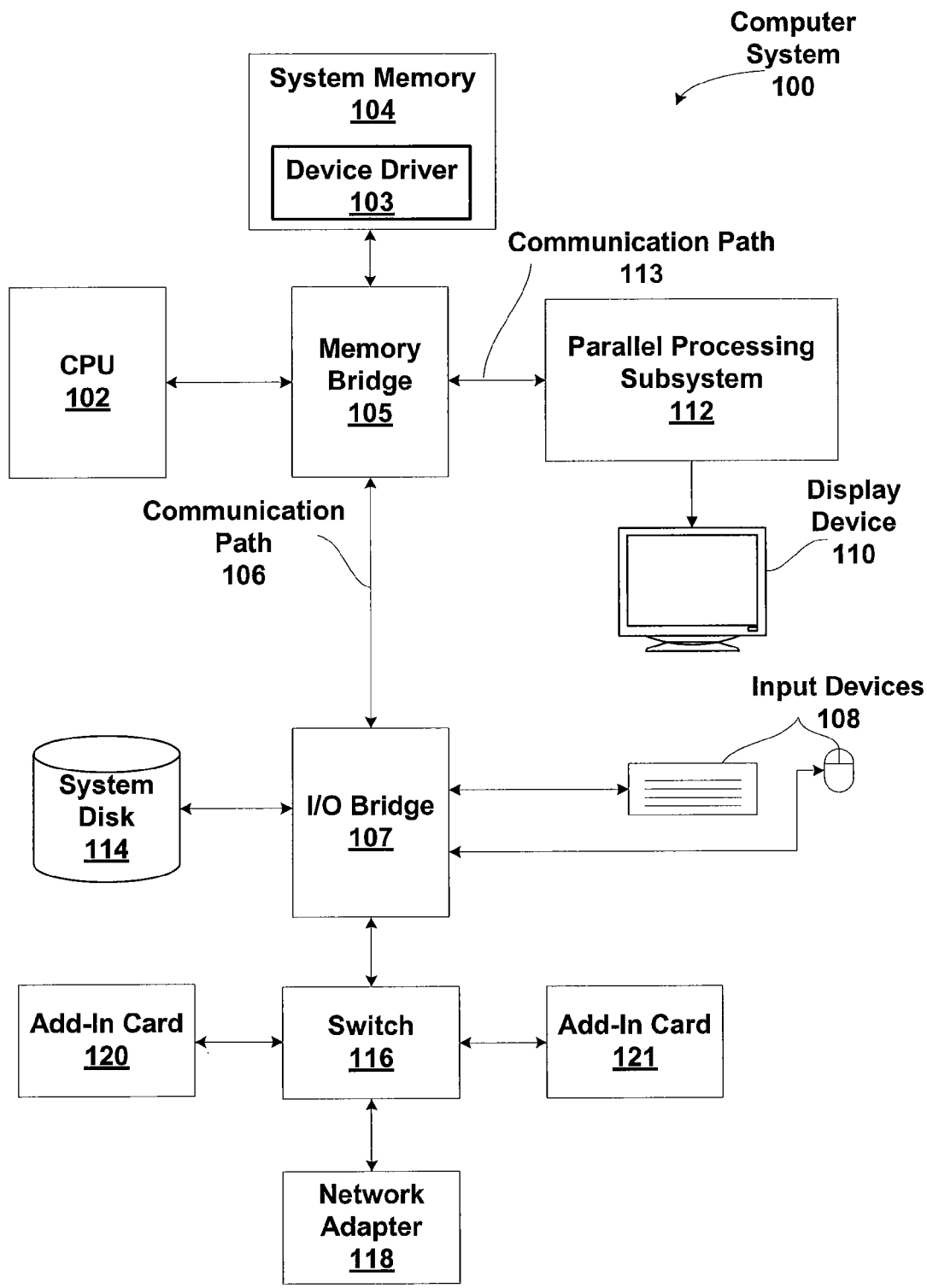
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
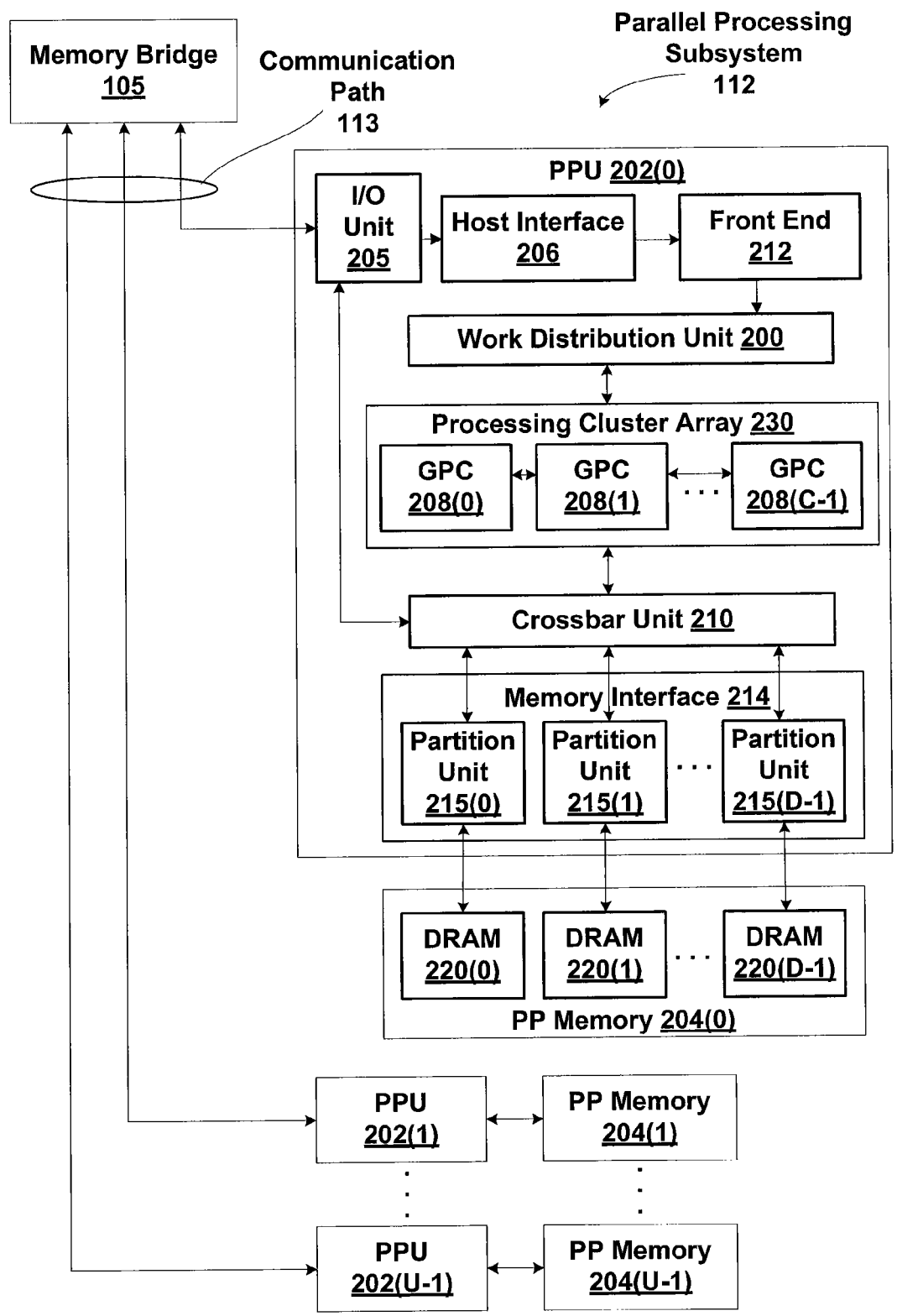
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
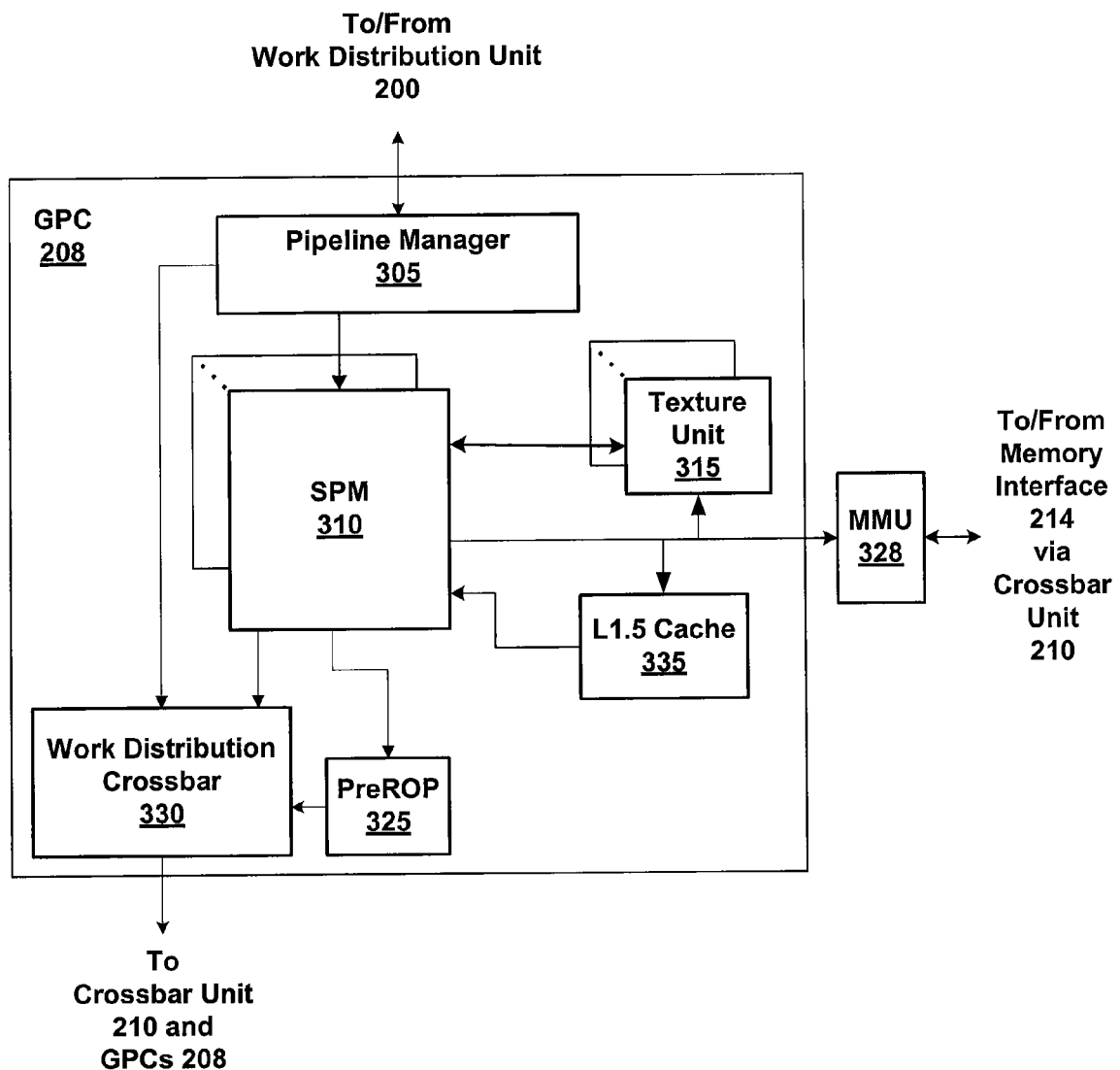
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
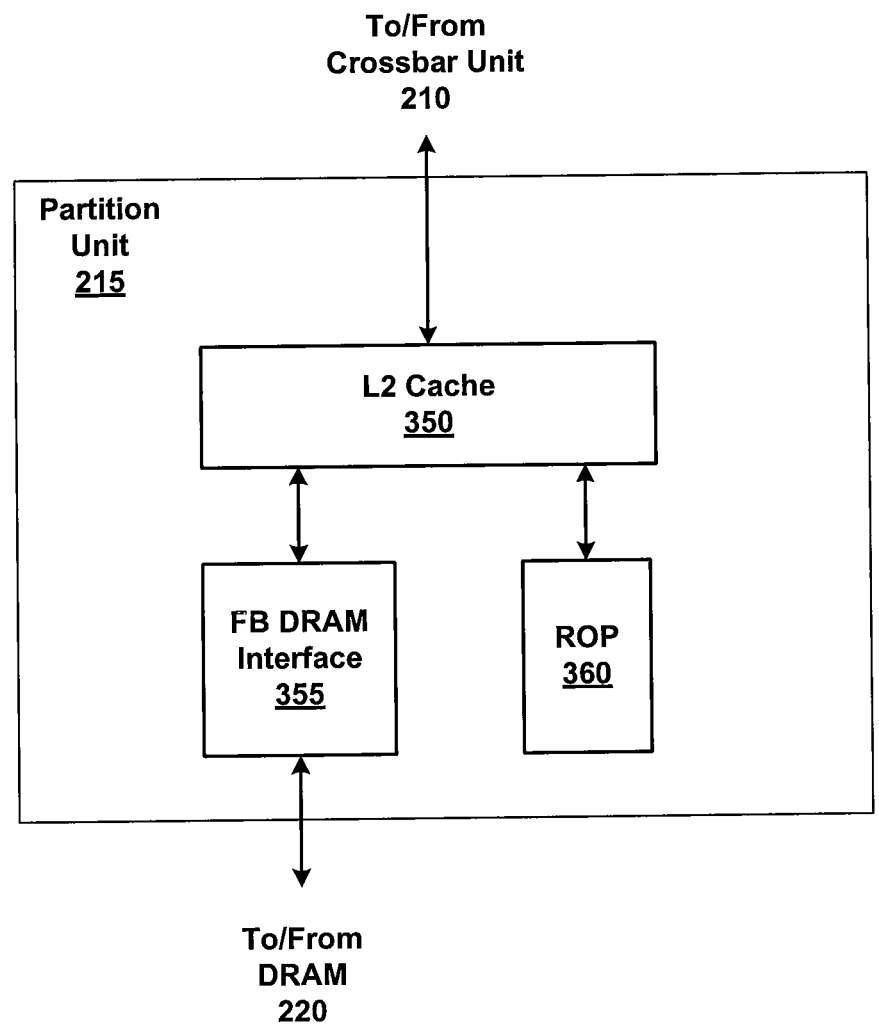
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
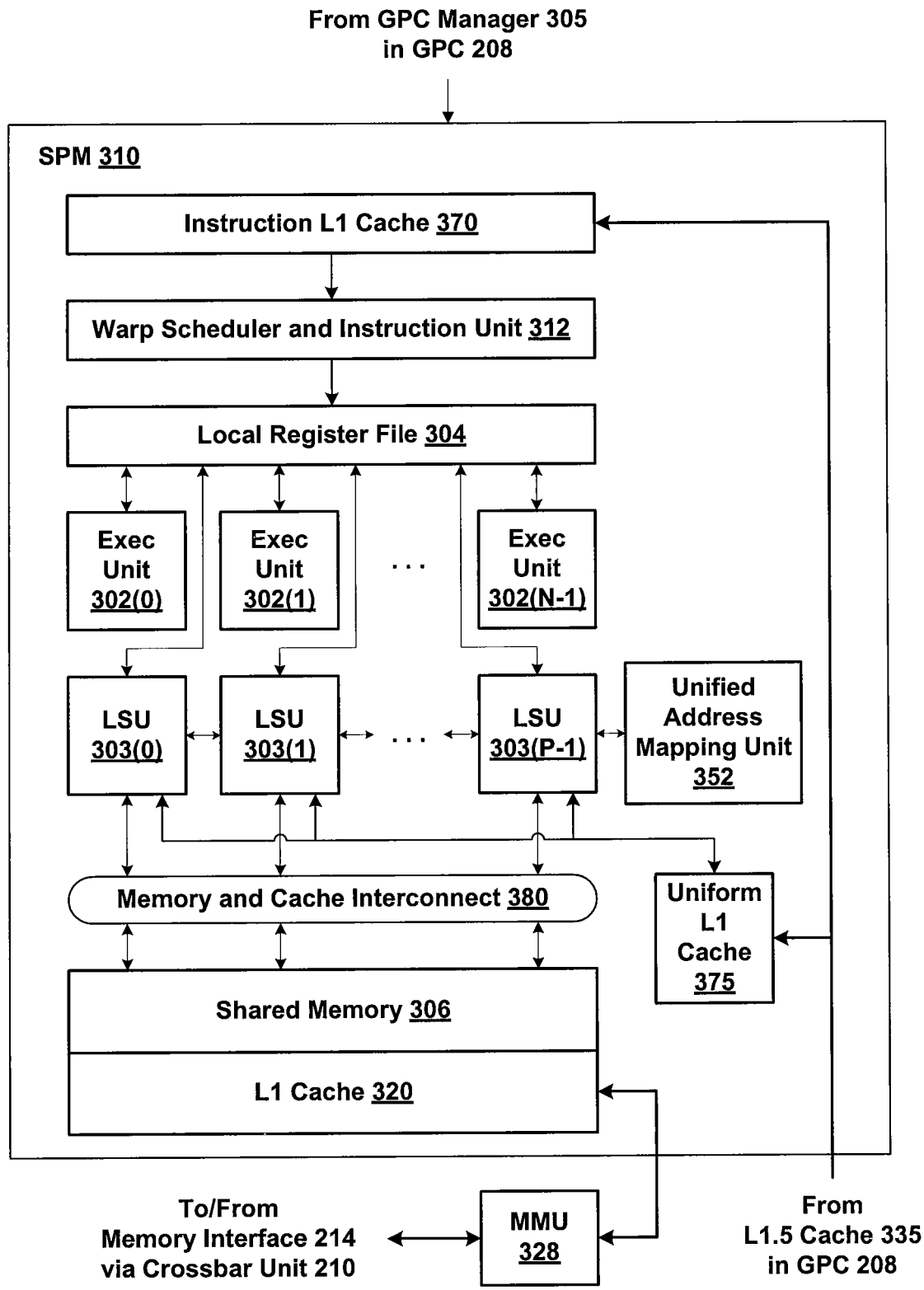
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
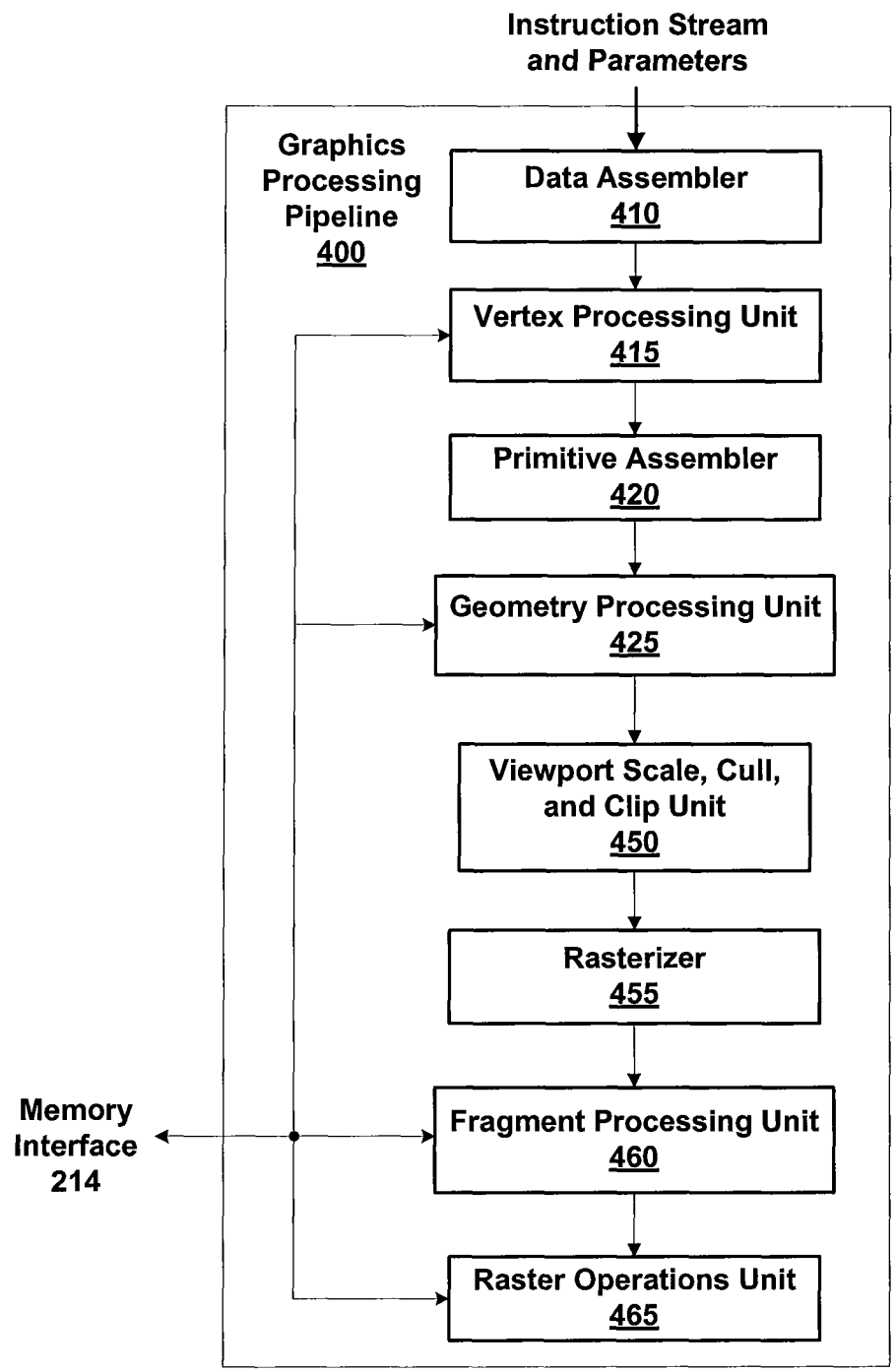
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Restart Index that Sets a Topology

A pushbuffer is an instruction stream and parameters that can include one or more command sequences. In some embodiments, a command comprises a header and data, where the header is 32-bit dword and the data is a 32 bit dword. A header specified by the type of command and may be associated with multiple data dwords, and a count (Cnt) field within the header may specify the number of times that the same command or sequentially adjacent commands are executed. Different command tags may be used to efficiently encode command repetition or structure. For example, a command that is often followed by plural instances of the same command may use an encoding that specifies that relationship. Graphics APIs, such as the OpenGL API, include explicit API-visible begin and end commands for primitive draw command sequences. Conventionally, the begin command and the end command are each included in a header within the pushbuffer instruction stream. Primitives to be rendered are placed between one or more pairs of headers that include begin and end commands in a sequence.

Figure 5:
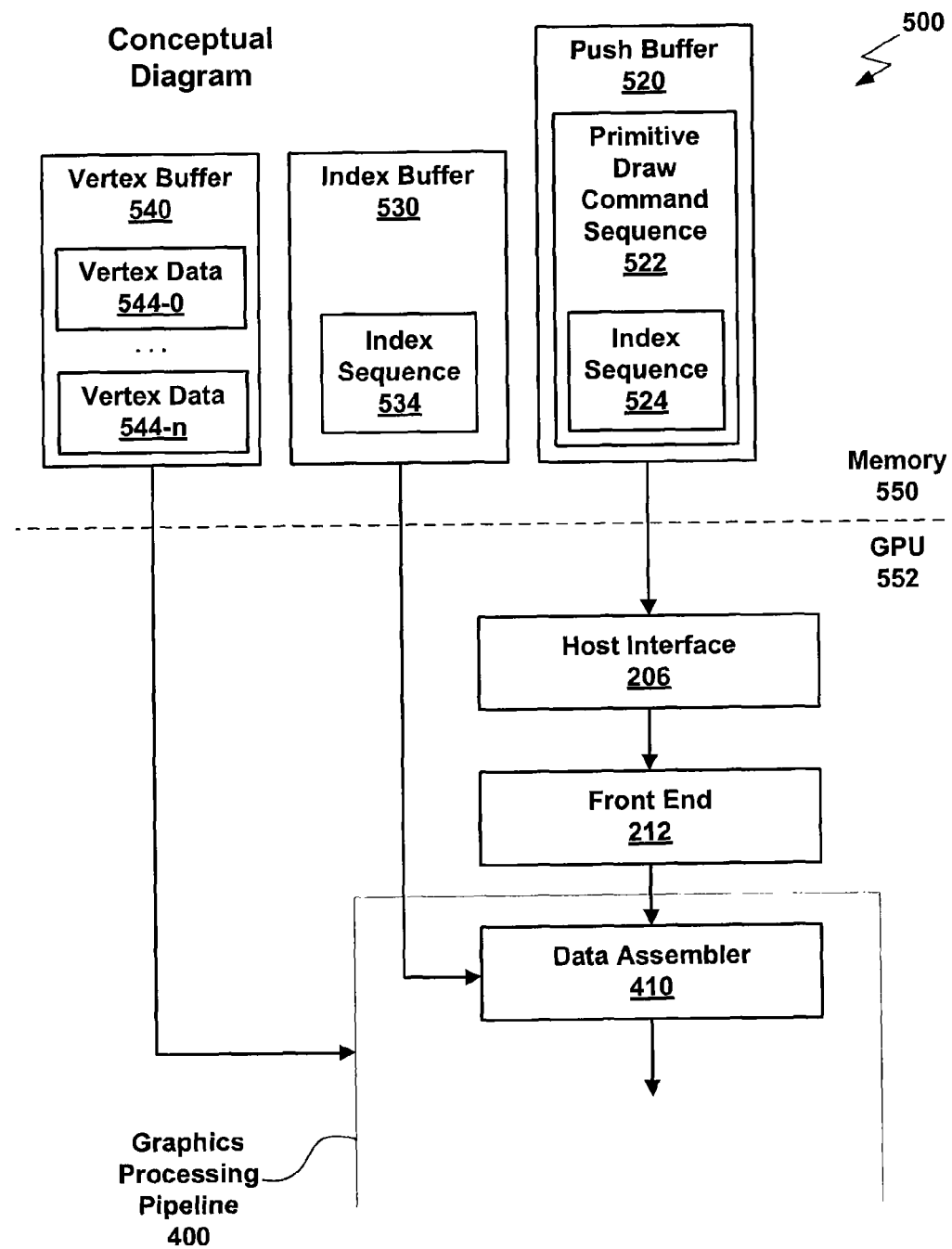
FIG. 5 is a conceptual diagram of a data path for transmitting primitive draw commands to a graphics processing unit, according to one embodiment of the present invention.

FIG. 5 is a conceptual diagram of a data path 500 for transmitting primitive draw commands to a GPU 552, according to one embodiment of the present invention. A vertex buffer 540, index buffer 530, and push buffer 520 are stored in memory 550. Vertex buffer 540 may be established using a buffer pointer, which may be set using any technically feasible technique. Similarly, index buffer 530 and push buffer 520 may each be established using buffer pointers. The buffer pointers are set using any technically feasible technique. Each buffer pointer serves as a base pointer to a respective buffer in memory. An arbitrary number of vertex, index, and push buffers may concurrently reside in memory 550, however respective buffer pointers establish which buffers should be used at any one time.

The memory 550 may comprise system memory 104 of FIG. 1, PP memory 204 of FIG. 2, on-chip memory within GPU 552, such as parallel processing subsystem 112, or any combination thereof. Data within the vertex buffer 540, index buffer 530, and push buffer 520 is transmitted to GPU 552 using any technically feasible technique. One technique involves the GPU 552 pulling certain data from memory 550 and buffering the data prior to use, thereby reducing performance bottlenecks associated with memory access latency.

The host interface 206 receives a primitive draw command sequence 522 via the push buffer 520. Buffer pointers for the vertex buffer 540 and index buffer 530 may be encoded in the primitive draw command sequence 522. The primitive command sequence 522 encodes a list of primitive draw commands that may include an arbitrary combination of primitive topologies. Primitive topologies may include, without limitation, lines, line strips, triangles, triangle strips, and so forth. The list of primitive draw commands is structured to reference vertex data 544 for related vertices stored in the vertex buffer 540 via a vertex index, which refers to a specific item of vertex data 544 within the vertex buffer 540. In one embodiment, the primitive draw command sequence 522 includes at least one in-line index sequence 524, which lists a set of primitive topologies to be rendered. The primitive topologies are listed in terms of associated vertex indices. In an alternative embodiment, the primitive draw command sequence 522 does not include in-line index sequence 524, but instead includes a reference to at least one index buffer 530, which includes index sequence 534. As with index sequence 524, index sequence 534 lists a set of primitive topologies to be rendered in terms of one or more sets of vertex indices.

The data assembler 410 is configured to interpret various index sequences. In one mode of operation, one or more index sequences are embedded within one or more primitive draw command sequences. For example, index sequence 524 is embedded within primitive draw sequence 522 and transmitted to the data assembler 410 via host interface 206 and front end 212. Primitive draw sequence 522 is stored within Push buffer 520 for transmission to host interface 206. In a second mode of operation, one or more index sequences are stored within one or more index buffers that are independent of the push buffer 520. The one or more index sequences are then pulled directly by the data assembler 410 for processing. For example, Index sequence 534 is stored in index buffer 530 and is pulled directly by the data assembler 410 from index buffer 530. Indices from index sequence 524 or 534 are transmitted into the graphics processing pipeline 400 as references to respective vertex data 544. Appropriate modules within the graphics processing pipeline 400 then pull vertex data 544 from vertex buffer 540 for rendering a given topology. Efficient transitions between different primitive topologies are enabled using a novel index scheme, as described below in FIG. 6B.

Figure 6A:
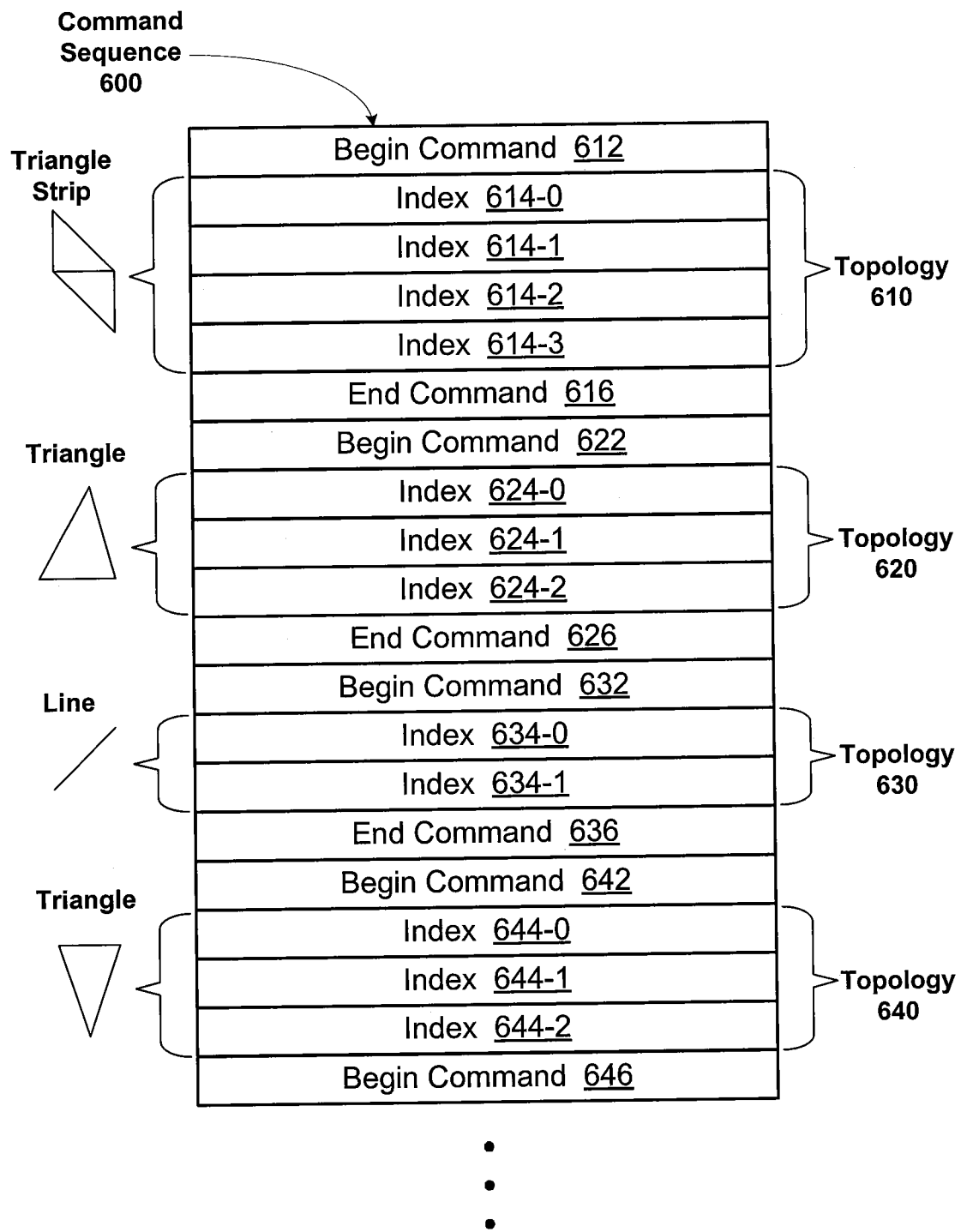
FIG. 6A is a conceptual diagram of a prior art command sequence for a set of different topologies.

FIG. 6A is a conceptual diagram of a prior art command sequence 600 for a set of different topology elements 610, 620, 630, 640. As shown, the prior art command sequence 600 reproduces API begin and end commands, including primitive topology information bounded by a begin command and an end command. Topology element 610 defines a topology element that is a triangle strip comprising indices 614-0 through 614-3, which are bounded by a begin command 612 and an end command 616. Begin command 612 specifies that topology element 610 is a triangle strip. Topology element 620 defines a topology element that is a stand alone triangle comprising indices 624-0 through 624-2, which are bounded by begin command 622 and end command 626. Begin command 622 specifies that topology element 620 is a stand alone triangle. Topology element 630 defines a topology element that is a line comprising indices 634-0 and 634-1, which are bounded by begin command 632 and end command 636. Begin command 632 specifies that topology element 630 is a line. Topology element 640 defines a topology element that is another stand alone triangle comprising indices 644-0 through 644-2, which are bounded by begin command 642 and end command 646. Begin command 642 specifies that topology element 640 is a stand alone triangle. As also shown, overhead from the begin and end commands reduces the efficiency of transmitting index data, which is necessary data for rendering a scene. In one scenario, each begin command comprises a thirty-two bit word, each end command comprises a thirty-two bit word, and each index comprises sixteen bits (half of a thirty-two bit word). In this scenario, topologies 610 through 640 require fifteen thirty-two bit words within the command sequence 600, with eight of the fifteen total words dedicated to overhead in the form of begin and end commands. In certain command structures, additional overhead is associated with the begin end commands. In other words, over half of the data transmitted in command sequence 600 is overhead.

Figure 6B:
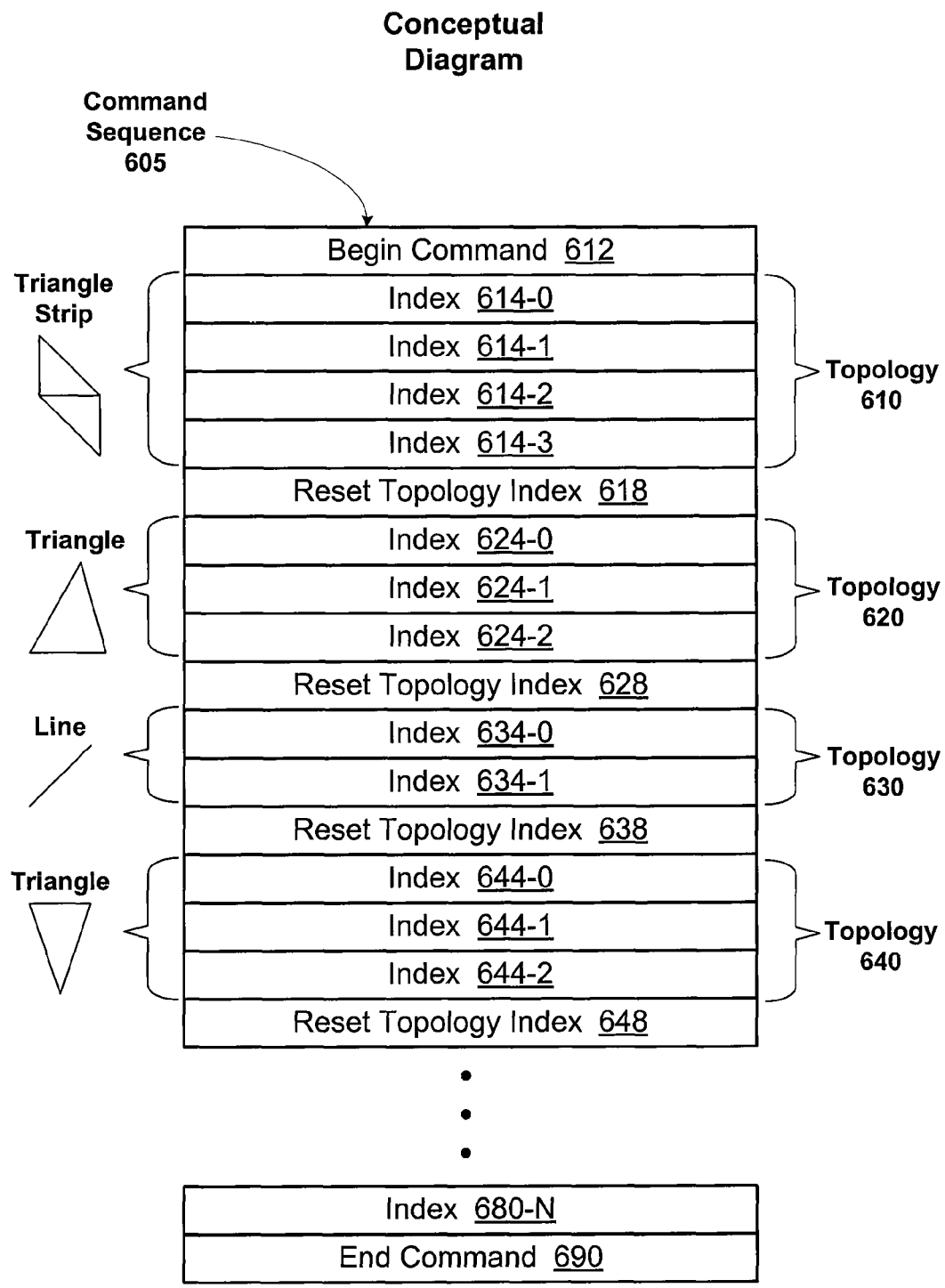
FIG. 6B is a conceptual diagram of a command sequence for a set of different topology elements, including reset topology indices, according to one embodiment of the present invention.

FIG. 6B is a conceptual diagram of a command sequence 605 for a set of different topology elements 610, 620, 630, 640 including reset topology indices 618, 628, 638, 648, according to one embodiment of the present invention. The reset topology index is a new construct that serves two functions. First, the reset topology index terminates a topology in progress, thereby acting as an end command. Second, the reset topology index begins an arbitrary topology, thereby acting as a begin command. Importantly, the reset topology index may be implemented as a specific index range carve out, thus consuming one index, which generally requires fewer bits to represent than either a begin or and end command. For example, in a scenario where a begin command takes a thirty-two bit header and has thirty-two bits of data, an end commend takes a thirty-two bit header and has thirty-two bits of data, and each index takes sixteen bits, the reset topology index requires only sixteen bits. The sixteen bits representing the reset topology index accomplish what otherwise takes one hundred twenty eight bits in prior art solutions.

In one embodiment, the reset topology index is represented as an index with "1 s" in the most significant bit positions, and a topology descriptor in a set of least significant bit positions. For example, an implementation using sixteen-bit index values may reserve the index range 0xFFF0 through 0xFFFF to serve as reset topology index values. In other words, when the twelve most significant bits are set to "1", the index is not in index of a vertex in memory, but rather, a reset topology index with the least significant four bits being a topology descriptor. The topology descriptor is interpreted to be the topology for indices that immediately follow the reset topology index. The reset topology index provides an innovative means for efficiently rendering a single list of indices as a unit that includes more than one topology. Each supported topology maps to a specific topology descriptor value.

As shown, topology element 610 defines a triangle strip topology element specified by indices 614-0 through 614-3. Topology element 610 is bounded by begin command 612 and reset topology index 618. In this example, topology element 610 is the first topology in command sequence 605. Begin command 612 specifies that topology element 610 is a triangle strip. Topology element 620 defines a stand alone triangle topology element specified by indices 624-0 through 624-2, which are bounded by the reset topology index 618 and reset topology index 628. Reset topology index 618 specifies an end to topology element 610 and a beginning to topology element 620. Reset topology index 618 also specifies that topology element 620 is a stand alone triangle. Topology element 630 defines a stand alone line topology element specified by indices 634-0 and 634-1, which are bounded by reset topology 628 and reset topology 638. Reset topology index 628 specifies an end to topology element 620, a beginning to topology element 630, and that topology element 630 is a line. Topology element 640 defines a stand alone triangle specified by indices 644-0 through 644-2, which are bounded by reset topology 638 and reset topology 648. Reset topology index 638 specifies an end to topology element 630, a beginning to topology element 640, and that topology element 630 is a stand alone triangle. In one embodiment, the begin command 612 includes a count value that indicates how many total indices are included in command sequence 605, including index 614-0 through 680-N. Command sequence 605 is ultimately terminated by end command 690.

Persons skilled in the art will recognize that different encodings for a reset topology index may be implemented without departing the scope or spirit of the present invention. For example, in systems utilizing thirty-two bit indices, an index with all upper twenty eight bits set to "1" may be interpreted as a reset topology index, with four least significant bits being interpreted as a four bit topology descriptor.

Figure 7:
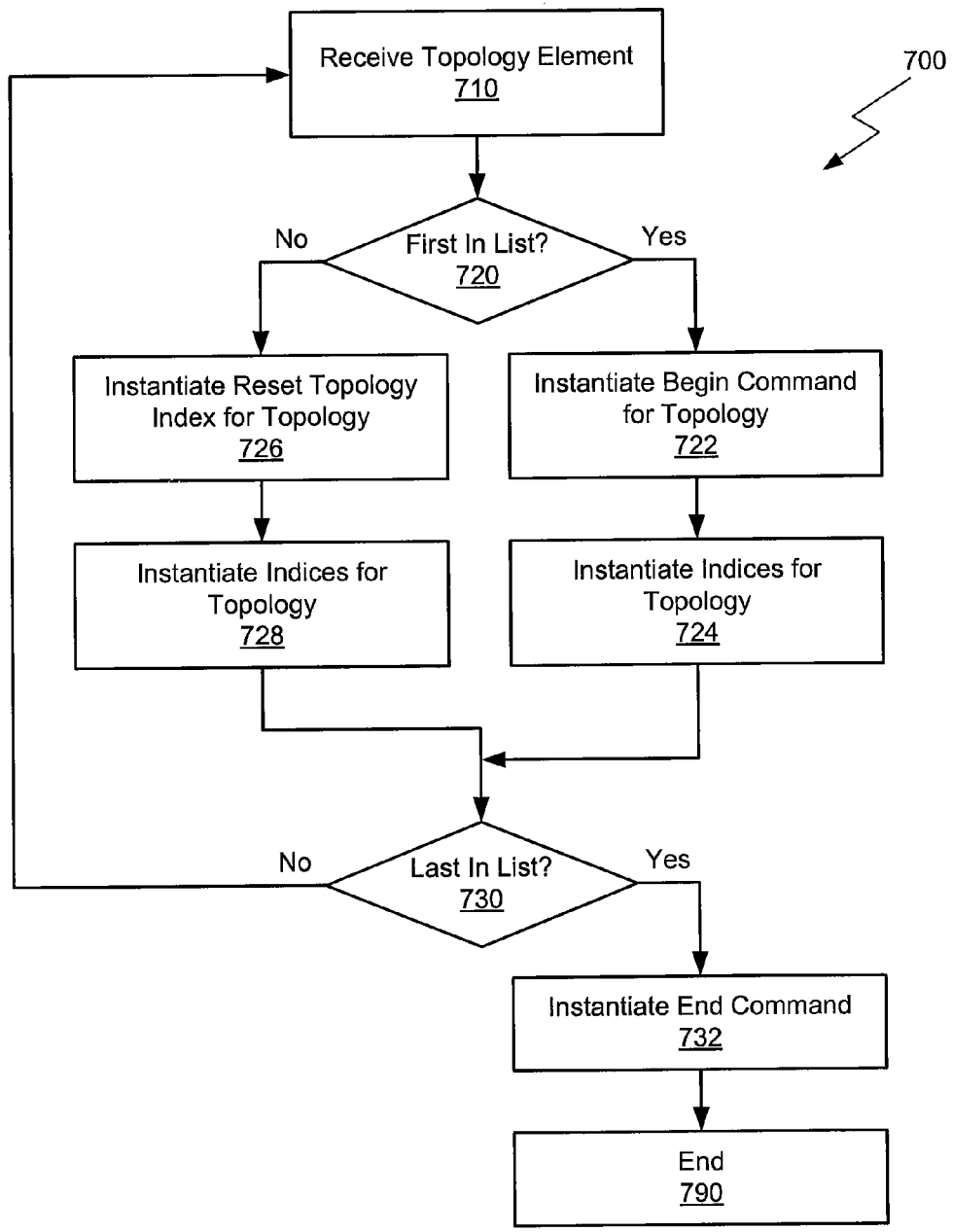
FIG. 7 is a flow diagram of method steps for composing an index sequence including a reset topology index, according to one embodiment of the present invention.

FIG. 7 is a flow diagram of method steps 700 for composing an index sequence including a reset topology index, according to one embodiment of the present invention. Although the method steps are described in conjunction with the systems of FIGS. 1-5, persons skilled in the art will understand that any system configured to perform the method steps, in any order, is within the scope of the invention.

The method steps are implemented by a command composition module. In one embodiment, the command composition module resides within an API, which is configured to receive primitive draw commands from an application program, thereby allowing an application program to specify reset topology indices. In an alternative embodiment, the command composition module resides within device driver 103, which is configured to receive primitive draw commands from the application program via the API. The command composition module composes an index sequence from the topology elements defined by the received primitive draw commands. The index sequence is configured to utilize reset topology indices for efficient transmission from memory 550 to the GPU 552. The topology elements are organized as sets, including a first topology element and a last topology element. Index sequence 534 is associated with one complete set of topology elements. Any feasible technique may be used to define a set of topology elements. For example, a set may be defined based on availability of unique indices within index sequence 534. Once no more topology elements can be represented by remaining unique index values within index sequence 534, the set is complete and a new index buffer is allocated for indices associated with additional topology elements. In one embodiment, the index sequence resides within the push buffer 520 of FIG. 5. In an alternative embodiment, the index sequence resides in the index buffer 530. The method steps 700 are repeated for each set of topology elements to be sent to the GPU 552.

The method begins in step 710, where the command composition module receives a primitive draw commands defining a topology element to be transmitted to the GPU 552 for rendering. The primitive draw commands may include an explicit begin draw command and an explicit end draw command, as specified explicitly in the API. If, in step 720, the draw command does not correspond to a first topology element in an associated set of topology elements, then the method proceeds to step 726. In step 726, the command composition module instantiates a reset topology index within the index sequence. The reset topology index includes a topology descriptor corresponding to a topology specification embedded in the primitive draw command. Instantiating the reset topology index comprises writing the reset topology index to the index sequence 524 or 534. In step 728, the command composition module instantiates indices for the topology element. The indices correspond to vertices specified in the primitive draw command. Attributes for the vertices are stored in the vertex buffer 540 as vertex data 544.

If, in step 730, the instantiated topology element represents the last primitive draw command in the associated set of primitive draw commands, then the method proceeds to step 732. In step 732, the command composition module instantiates an end command in the index sequence. In step 732, a total index sequence count may be written to an associated begin command for the index sequence. The method terminates in step 790. In some embodiments, a begin commend implies an end on the previous draw, and in these embodiments, an explicit end command is not needed. In some embodiments, any command that sets the topology is considered to be an implied begin command, in which case a separate begin command is not needed. In some embodiments, draw commands include either or both an implicit begin and/or an implicit end.

Returning to step 720, if the draw command does correspond to a first topology element in an associated set of topology elements, then the method proceeds to step 722. In step 722, the command composition module instantiates a begin command within the index sequence for a corresponding topology element. In one embodiment, the begin command replicates the begin command specified by the primitive draw command. In step 724, the command composition module instantiates indices for the topology element. The indices correspond to vertices specified in the primitive draw command.

Returning to step 730, if the topology element does not comprise the last primitive draw command in the associated set of primitive draw commands, then the method proceeds back to step 710. As described previously, any technically feasible technique may be used to define a set of topology elements.

Figure 8:
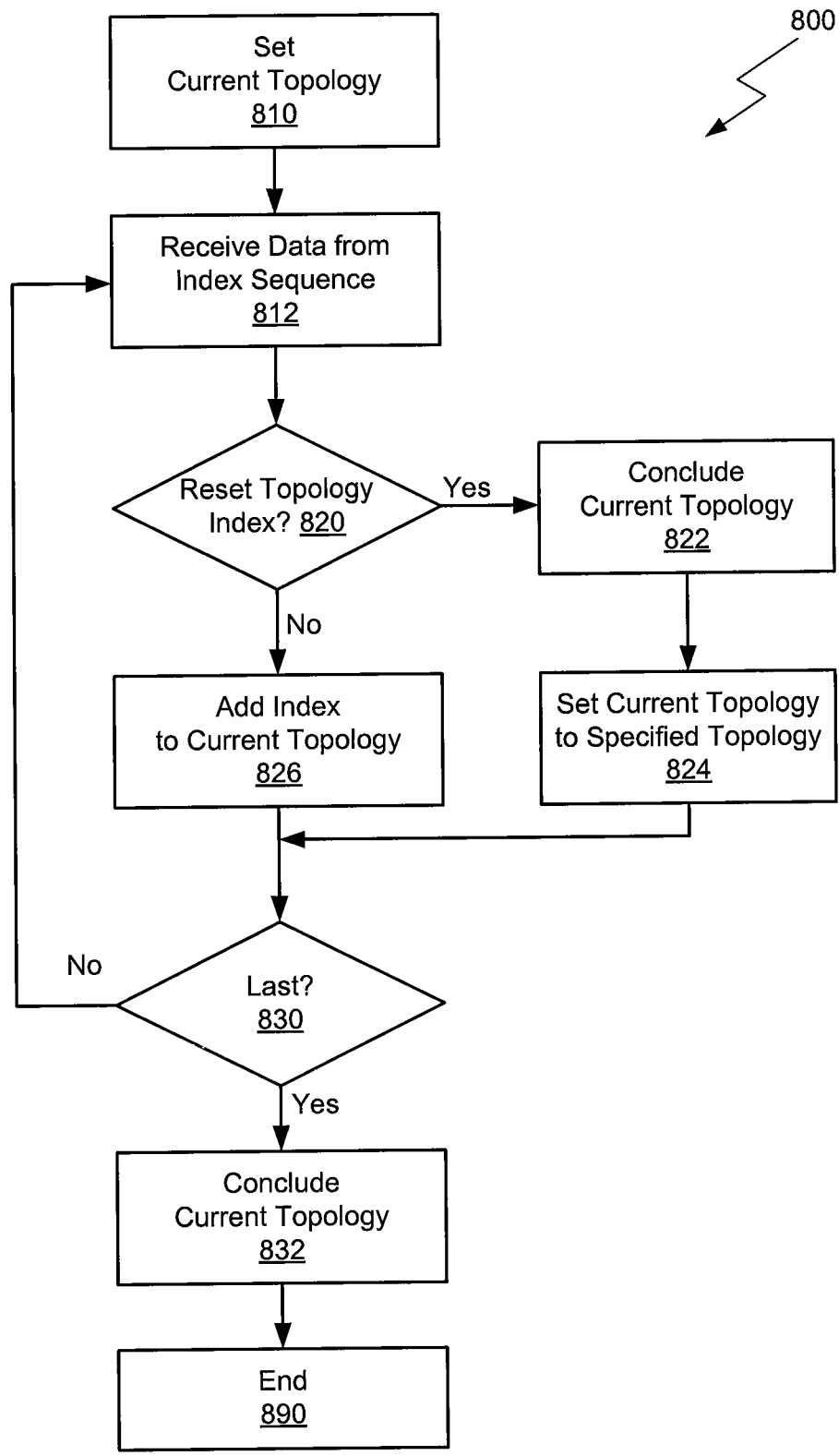
FIG. 8 is a flow diagram of method steps for interpreting an index sequence including a reset topology index, according to one embodiment of the present invention.

FIG. 8 is a flow diagram of method steps 800 for interpreting an index sequence including a reset topology index, according to one embodiment of the present invention. Although the method steps are described in conjunction with the systems of FIGS. 1-5, persons skilled in the art will understand that any system configured to perform the method steps, in any order, is within the scope of the invention.

The data assembler unit 410 of FIG. 4 is configured to receive the index sequence as part of a command sequence, such as primitive draw command sequence 522, and to interpret the index sequence for processing by other elements in the graphics processing pipeline 400. The data assembler unit 410 interprets the index sequence according to the structure described previously in FIG. 6B. In one embodiment, the index sequence resides within the push buffer 520 of FIG. 5 as index sequence 524. In an alternative embodiment, the index sequence resides in the index buffer 530 as index sequence 534.

The method begins in step 810, where the data assembler unit 410 sets a current topology based on a begin command from a command sequence within push buffer 520, such as primitive draw command sequence 522. The begin command may include a count specifying how many indices define the set of topology elements. In step 812, the data assembler unit 410 receives index data from the index sequence. If, in step 820, the index data is a reset topology index, then the method proceeds to step 822. In step 822, the data assembler unit 410 concludes the current topology, indicating to one or more shading units within the graphics processing pipeline 400 that the topology specification is complete and the topology element is ready for processing. In step 824, the data assembler unit 410 decodes the reset topology index to extract a topology descriptor. The data assembler unit 410 then sets the current topology to the topology specified by the topology descriptor.

If, in step 830, the index data is the last index data for an associated index sequence, then the method proceeds to step 832. The index data may be determined to be the last index data using any technically feasible technique. For example, an index count specified in a begin command may specify a total number of indices to be processed within an index sequence. When the total number of indices is processed, then an index is determined to be the last index for the index sequence. In step 832, the data assembler unit 410 concludes the current topology, indicating to one or more shading units within the graphics processing pipeline 400 that the topology specification is complete and the topology element is ready for processing. The method terminates in step 890.

Returning to step 820, if the data is not a reset topology index, then the method proceeds to step 826. In step 826, the data assembler unit 410 adds the current index to the current topology.

Returning to step 830, if the index data is not the last index data for the associated index sequence, then method then proceeds back to step 812.

In sum, a technique for representing primitive draw commands is disclosed that more efficiently represents an index sequence comprising different types of intermixed primitive topologies. A software command composition module is configured to receive primitive draw commands that each include a topology specification and to beneficially encode the primitive draw commands to include reset topology indices rather than explicit begin and end drawing commands when possible. The data assembler unit within the graphics processing pipeline is configured to interpret each reset topology index as an end draw command and a begin draw command with a topology specified in the topology descriptor portion of the reset topology index. One advantage of the present invention is that index sequences composed using reset topology indices may reduce the total amount of data transmitted to the GPU, thereby improving overall system performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for generating an index sequence, the method comprising:
receiving a topology element via an application programming interface (API) that includes a draw command defining a topology to be drawn, and a set of vertex indices for the topology that refer to vertex data residing in a vertex buffer;
instantiating a reset topology index within an index buffer, wherein the reset topology index includes a topology descriptor for the topology; and
instantiating the set of vertex indices within the index buffer,
wherein a combination of the reset topology index and the set of vertex indices forms the index sequence, and
wherein the index sequence is transmitted to a processing unit for processing plural draw commands for different types of topologies using one index sequence.

2. The method of claim 1, wherein the received topology element comprises a begin command.

3. The method of claim 1, wherein the index sequence is between a begin command and an end command.

4. The method of claim 1, wherein the reset topology index comprises a constant pattern that defines the reset topology index.

5. The method of claim 4, wherein the constant pattern comprises a sequence of ones in a set of most significant bit positions.

6. The method of claim 5, wherein the topology descriptor comprises bits from a set of least significant bit positions.

7. The method of claim 5, wherein the reset topology index comprises sixteen bits, and the topology descriptor comprises four least significant bits.

8. The method of claim 1, wherein the vertex buffer and index buffer reside in a system memory.

9. The method of claim 8, wherein the vertex buffer is located within the system memory via a first buffer pointer, and the index buffer is located within the system memory via a second buffer pointer.

10. A computer-implemented method for interpreting an index sequence to render a topology, the method comprising:
receiving data from the index sequence that includes a first index that is associated with the index sequence and defines at least in part a first topology;
determining that the first index comprises a reset topology index based on at least a portion of the first index matching a constant pattern;
changing a current topology to the first topology based on a topology descriptor extracted from the first index, wherein the current topology is different than the first topology;
accumulating a plurality of vertices included within the first topology; and
processing the plurality of vertices to render the first topology.

11. The method of claim 10, wherein the reset topology index comprises a constant pattern that defines the reset topology index.

12. The method of claim 11, wherein the constant pattern comprises a sequence of ones in a set of most significant bit positions.

13. The method of claim 12, wherein the topology descriptor comprises bits from a set of least significant bit positions.

14. The method of claim 12, wherein the reset topology index comprises sixteen bits and the topology descriptor comprises four least significant bits.

15. The method of claim 10, wherein the vertex buffer and index buffer reside in a system memory.

16. The method of claim 15, wherein the vertex buffer is located within the system memory via a first buffer pointer, and the index buffer is located within the system memory via a second buffer pointer.

17. The method of claim 10, wherein the step of accumulating further comprises the step of adding the current index to the first topology.

18. A computer system, comprising:
   a system memory;
   a first processing unit coupled to the system memory and configured to:
      receive a topology element via an application programming interface (API) that includes a draw command defining a topology to be drawn, a set of vertex indices for the topology that refer to vertex data residing in a vertex buffer, and an end draw command;
      instantiate a reset topology index within an index buffer, wherein the reset topology index includes a topology descriptor for the topology; and
      instantiate the set of vertex indices within the index buffer,
      wherein a combination of the reset topology index and the set of vertex indices forms the index sequence, and
      wherein the index sequence is transmitted to a processing unit for processing plural draw commands for different types of topologies using one index sequence;
   a second processing unit coupled to the system memory and configured to:
      receive data from the index sequence that includes a first index that is associated with the index sequence and defines at least in part a first topology;
         determine that the first index comprises a reset topology index based on at least a portion of the first index matching a constant pattern;
         change a current topology to the first topology based on a topology descriptor extracted from the first index;
         accumulate a plurality of vertices included within the first topology; and
      process the plurality of vertices to render the first topology.

19. The system of claim 18, wherein the received topology element comprises a begin command.

20. The system of claim 18, wherein the index sequence is between a begin command and an end command.

21. The system of claim 18, wherein the reset topology index comprises a constant pattern that defines the reset topology index.

22. The system of claim 21, wherein the reset topology index comprises sixteen bits, the constant pattern comprises a string of ones in the twelve most significant bits, and the topology descriptor comprises four least significant bits.

23. The system of claim 18, wherein the vertex buffer and index buffer reside in the system memory.

24. The system of claim 18, wherein the vertex buffer is located within the system memory via a first buffer pointer, and the index buffer is located within the system memory via a second buffer pointer.

* * * * *